United States Patent
Son et al.

(10) Patent No.: US 8,965,218 B2
(45) Date of Patent: Feb. 24, 2015

(54) METHOD OF VISIBLE LIGHT COMMUNICATION USING ILLUMINANCE SENSOR AND MOBILE COMMUNICATION TERMINAL FOR THE SAME

(75) Inventors: Jae-Seung Son, Suwon-si (KR); Tae-Han Bae, Seoul (KR); Eun-Tae Won, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 112 days.

(21) Appl. No.: 13/547,980

(22) Filed: Jul. 12, 2012

(65) Prior Publication Data
US 2013/0016978 A1 Jan. 17, 2013

(30) Foreign Application Priority Data
Jul. 12, 2011 (KR) ........................ 10-2011-0069159

(51) Int. Cl.
*H04B 10/00* (2013.01)
*H04B 10/116* (2013.01)
*H04W 88/06* (2009.01)

(52) U.S. Cl.
CPC ............. *H04B 10/116* (2013.01); *H04W 88/06* (2013.01)

USPC ........... 398/172; 398/118; 398/127; 398/128; 398/130; 398/202; 398/208; 398/209

(58) Field of Classification Search
CPC .. H04B 10/11; H04B 10/112; H04B 10/1121; H04B 10/1123; H04B 10/1125; H04B 10/1127; H04B 10/1129; H04B 10/114; H04B 10/1141; H04B 10/1143; H04B 10/1149; H04B 10/116; H04B 10/118
USPC ......... 398/172, 118, 128, 130, 127, 129, 119, 398/120, 131
See application file for complete search history.

(56) References Cited
U.S. PATENT DOCUMENTS

2009/0028572 A1* 1/2009 Watanabe ...................... 398/118
2009/0208221 A1* 8/2009 Sasai ............................. 398/130

\* cited by examiner

*Primary Examiner* — Hanh Phan

(57) ABSTRACT

According to one embodiment, a photo detector-combined illuminance sensor includes a circuit for a Photo Detector (PD) function to detect the illuminance of the ambient environment. The illuminance sensor operates under the control of a controller in a visible light communication terminal. When an optical signal detected by the illuminance sensor is a visible light communication signal, the controller switches to cause the illuminance sensor to operate as the photo detector for the visible light communication in a visible light communication mode.

20 Claims, 4 Drawing Sheets ered by an LED or a Laser Diode (LD) that transmits or receives data using visible light simultaneously while performing an illumination function, and a VLC terminal, which is equipped with a VLC transmission/reception module that performs data transmission/reception with the light source. The VLC terminal may include any suitable device, such as a mobile communication terminal, such as a mobile phone or a Personal Digital Assistant (PDA), or a desktop-type stationary terminal.

METHOD OF VISIBLE LIGHT COMMUNICATION USING ILLUMINANCE SENSOR AND MOBILE COMMUNICATION TERMINAL FOR THE SAME

CROSS-REFERENCE TO RELATED APPLICATION(S) AND CLAIM OF PRIORITY

The present application is related to and claims the priority under 35 U.S.C. §119(a) of an application entitled "Method Of Visible Light Communication Using Illuminance Sensor And Mobile Communication Terminal For The Same" filed in the Korean Industrial Property Office on Jul. 12, 2011 and assigned Serial No. 10-2011-0069159, the contents of which are hereby incorporated by reference.

TECHNICAL FIELD OF THE INVENTION

The present invention relates generally to communication devices, and more particularly, to a method for performing visible light communication using an illuminance sensor and the illuminance sensor for the method.

BACKGROUND OF THE INVENTION

Visible Light Communication (VLC) generally uses a Light Emitting Diode (LED) and a Photo Diode (PD) for transmission and reception of data using visible light. Therefore, VLC systems include a light source, which is provided by an LED or a Laser Diode (LD) that transmits or receives data using visible light simultaneously while performing an illumination function, and a VLC terminal, which is equipped with a VLC transmission/reception module that performs data transmission/reception with the light source. The VLC terminal may include any suitable device, such as a mobile communication terminal, such as a mobile phone or a Personal Digital Assistant (PDA), or a desktop-type stationary terminal.

SUMMARY OF THE INVENTION

To address the above-discussed deficiencies of the prior art, it is a primary object to provide a method and system for visible light communication using an illuminance sensor. An LED may be used as a visible light transmitter for VLC in a mobile communication terminal, and a visible light receiver.

For example, with the development of image communication technology and image input and recognition devices, such as digital cameras configured in mobile communication terminals, there may be increasing demands for optical sensors, such as image, color or illuminance sensors. Since these optical sensors can receive an optical signal, it may be unnecessary to additionally include a separate visible light receiver if such an optical sensor can be implemented as a visible light receiver for visible light communication. However, it may be difficult to perform the visible light communication using only existing optical sensors.

For receiving visible light, the current mobile communication terminal may be equipped with a photo diode. However, the addition of a photo diode to a mobile communication terminal may increase the manufacturing cost of the mobile communication terminal.

Accordingly, an aspect of the present invention is to solve the above-mentioned problems occurring in the prior art, and to provide a method for implementing a visible light receiver by using an existing optical sensor, and a visible light communication terminal for the same.

Another aspect of the present invention is to provide a method for performing visible light communication by using an illuminance sensor, which uses an existing optical sensor configured in a terminal, and the illuminance sensor for the same.

In accordance with an aspect of the present invention, there is provided a mobile communication terminal for performing a visible light communication in which the mobile communication terminal includes an illuminance sensor configured to receive an optical signal and convert the optical signal to an electrical signal, the illuminance sensor configured to amplify, filter, and output the converted electrical signal when the mobile communication terminal is in a visible light communication mode, and the illuminance sensor measuring an illuminance by using the converted electrical signal and then output the measured illuminance when the mobile communication terminal is in an illuminance measurement mode, and a controller configured to determine whether a signal output from the illuminance sensor includes a visible light communication signal, and measure an illuminance when the signal output from the illuminance sensor is not a visible light communication signal.

In accordance with another aspect of the present invention, a method of performing a visible light communication by a mobile communication terminal including an illuminance sensor includes demodulating a signal output from the illuminance sensor to generate data based on a visible light communication scheme in a visible light communication mode, determining whether the output signal corresponds to a visible light communication signal, by using the demodulated data, and when the output signal does not correspond to a visible light communication signal, switching the visible light communication mode into an illuminance measurement mode for measuring an illuminance by the illuminance sensor.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

Figure 1:
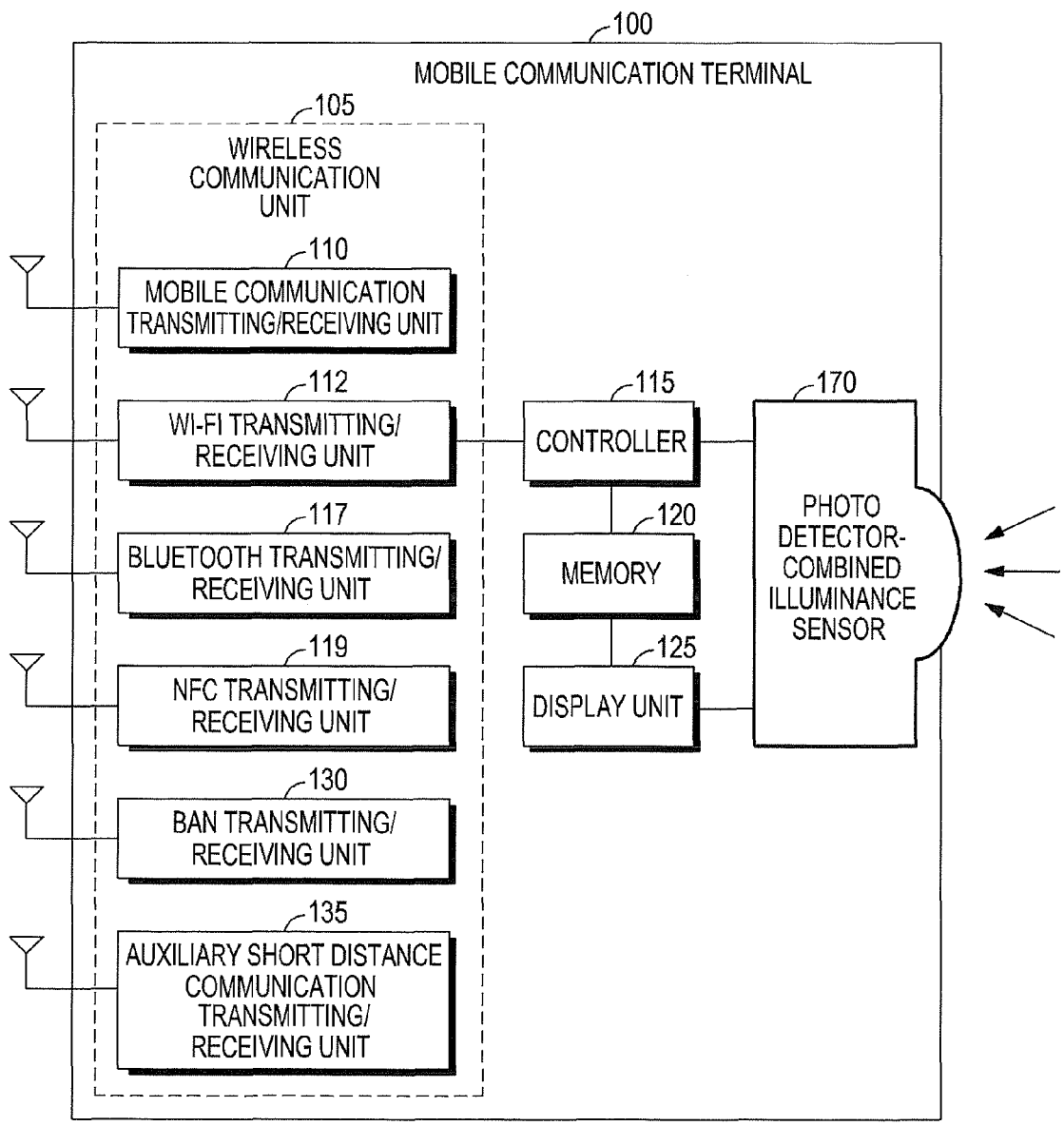
FIG. 1 illustrates an example visible light communication terminal according to an embodiment of the present invention.

FIGS. 1 through 4, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged Visible Light Communication (VLC) devices. Hereinafter, an exemplary embodiment of the present invention will be described in detail with reference to the accompanying drawings. In the following description, the same elements will be designated by the same reference numerals although they are shown in different drawings. Further, in the following description, a detailed explanation of known related functions and constitutions may be omitted to avoid unnecessarily obscuring the subject matter of the present invention.

The following description presents a representative embodiment of the present invention for accomplishing the technical object described above. Further, for convenience of description, terms defined in the field of VLC are used without limiting the scope of the present invention by the standards or terms used herein.

The present invention discloses a scheme for implementing a visible light receiver without additionally equipping an photo diode in a mobile communication terminal. To this end, the present disclosure provides a photo detector-combined illuminance sensor by adding a circuit for a Photo Detector (PD) function to the illuminance sensor that detects the illuminance of surroundings. Such an illuminance sensor may operate under the control of a controller in a visible light communication terminal. When an optical signal detected by the illuminance sensor is a visible light communication signal, the controller switches in order to cause the illuminance sensor to operate as the photo detector for the visible light communication. As a result, terminal may receive data through the visible light communication by using an illuminance sensor configured in a mobile communication terminal.

Before describing the present invention, a brief description about illuminance sensors used in the present invention will be give below. In general, illuminance sensors are used to automatically control the brightness of a screen through measurement of the illuminance of surroundings. Since the brightness control using an illuminance sensor as described above can reduce power consumption, it may be useful to increase the battery life. In particular, in the case of a smart phone, the trend to increase the time using smart phones by users has caused increased battery life to become an important issue. Accordingly, there is a rapid increase in the demand for illuminance sensors to be mounted in mobile communication terminals.

According to the increase in the use of illuminance sensors configured in mobile communication terminals, the existing illuminance sensor may also be configured to receive optical signals according to the present invention. Particularly, the present invention proposes a simple addition of a circuit to the illuminance sensor, which enables the illuminance sensor to operate as a visible light receiver for the visible light communication. By using such an illuminance sensor, the mobile communication terminal can operate as a visible light communication terminal.

Hereinafter, elements and operation of the mobile communication terminal including the visible light communication function are described with reference to FIG. 1.

Referring to FIG. 1, a mobile communication terminal 100 includes a wireless communication unit 105, a controller 115, a memory 120, a display unit 125, and a photo detector-combined illuminance sensor 170. Not all elements illustrated in the FIG. 1 are indispensable, and it is thus possible to implement a mobile communication terminal having more elements or lesser elements than the elements shown in FIG. 1.

The wireless communication unit 105 may include one or more modules enabling wireless communication between a mobile communication terminal and a wireless communication system or between networks where mobile communication terminals are located. For example, the wireless communication unit 105 may include a mobile communication transmitting/receiving unit 110, a Wi-Fi transmitting/receiving unit 112, a Bluetooth transmitting/receiving unit 117, a Near Field Communication (NFC) transmitting/receiving unit 119, a Body Area Network (BAN) transmitting/receiving unit 130, and an auxiliary short distance communication transmitting/receiving unit 135.

The memory 120 where programs executed by the controller 115 are stored may include a topology supported for the visible light communication. For example, the stored topology may include a P2P (peer-to-peer) topology, a broadcast topology, and a star topology.

The display unit 125 displays information processed in the mobile communication terminal 100. For example, when the mobile communication terminal 100 is in a communication mode, the display unit 125 may display a UI (User Interface) or a GUI (Graphic User Interface) related to the communication. When the display unit 125 and a touch sensor for detecting a touch operation are configured in the display unit 125, the display 125 may be used as not only an output device but also an input device. For example, the touch sensor may be considered to include a form of a touch pad, etc.

The photo detector-combined illuminance sensor 170 receives an optical signal transmitted from a light source, converts the received optical signal to an electrical signal, and the outputs the converted electrical signal. In general, a photo detector corresponds to a semiconductor diode and includes photoelectric conversion elements, such as a photo-diode usually used for detecting an optical signal by generating electric current corresponding to the received optical signal. However, in the present invention, a circuit configuring unit including a low noise amplifier/filter is added to the illuminance sensor 170, so as to enable the photo detector-combined illuminance sensor 170 to operate as a photo detector without additionally arranging the photo diode for implementing the photo detector.

When the photo detector-combined illuminance sensor 170 operates as a photo detector, the photo detector-combined illuminance sensor 170 processes an optical signal received through a circuit configuring unit using a low noise amplifier/filter as described above. In contrast, when the photo detector-combined illuminance sensor 170 operates as an illuminance sensor for measuring an illuminance of the surroundings, the photo detector-combined illuminance sensor 170 measures the illuminance by converting an optical signal received through a light receiving element to an electrical signal, outputting the electrical signal, and then measuring the light quantity. In the case in which the photo detector-combined illuminance sensor 170 operates as an illuminance sensor, the illuminance measurement method usually changes depending on the type of the illuminance sensor. Therefore, a detailed explanation on the operation of the illuminance sensor will be omitted here.

The controller 115 controls the general operations of the mobile communication terminal 100. Further, the controller 115 determines an operation mode of the photo detector-combined illuminance sensor 170 according to an embodiment of the present invention. Once the operation mode is determined, the controller 115 switches to make the photo detector-combined illuminance sensor 170 operate in one of the visible light communication mode and the illuminance measurement mode.

To this end, the controller 115 determines whether a signal outputted from the photo detector-combined illuminance sensor 170 is a visible light communication signal. Particularly, the controller 115 may demodulate the output signal into data in accordance with the visible light communication scheme. Based on such data, the controller 115 determines whether the demodulated data corresponds to data associated with VLC. When the demodulated data corresponds to VLC communication, the controller 115 determines that a visible light communication signal has been received.

When the visible light communication signal has been received, the controller 115 switches the received optical signal to pass through the circuit configuring unit including the low noise amplifier/filter configured in the photo detector-combined illuminance sensor 170. According to an embodiment of the present invention, the visible light communication mode may be configured as an initial mode to ease determining whether an output signal is the visible light communication signal.

When a module for the visible light communication is implemented within the mobile communication terminal 100 as described above, an LED used for a camera flash can perform the function of transmitting a visible light signal. In this case, the mobile communication terminal 100 may operate as a transmitter of the visible light communication. When the mobile communication terminal 100 is provided with the photo detector-combined illuminance sensor 170, the mobile communication terminal 100 can also perform all the transmission/reception function of the visible light communication.

Hereinafter, the elements and operation of the photo detector-combined illuminance sensor 170 will be described in more detail with reference to FIG. 2.

Figure 2:
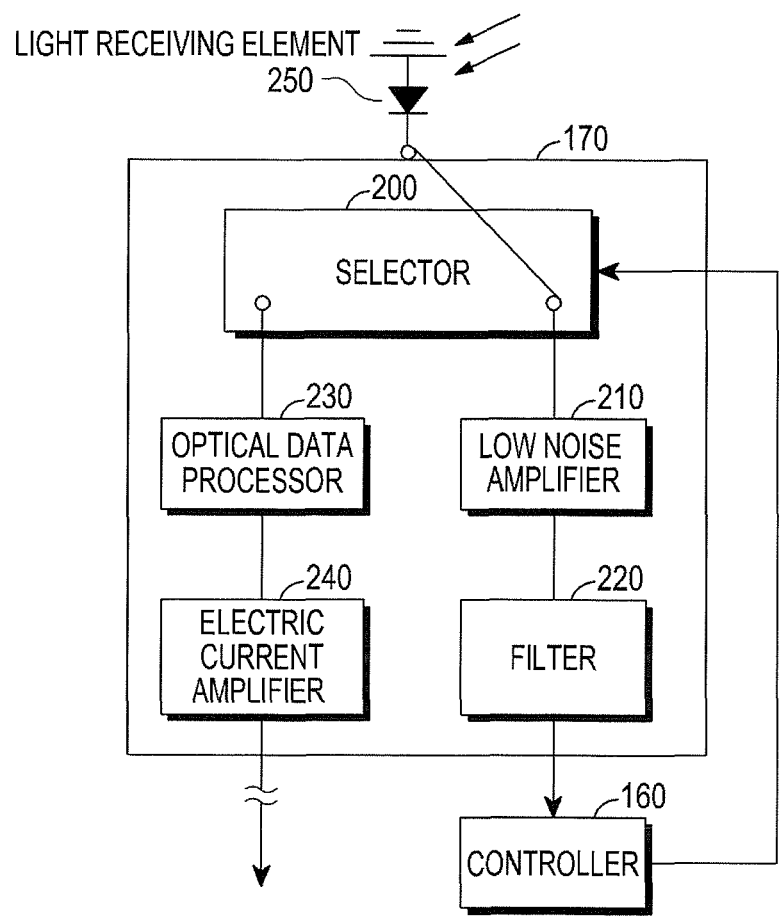
FIG. 2 illustrates an example illuminance sensor according to an embodiment of the present invention.

Referring to FIG. 2 the photo detector-combined illuminance sensor 170 generally includes a selector 200, a low noise amplifier 210, a filter 220, an optical data processor 230, an electric current amplifier 240, and a light receiving element 250.

First, the light receiving element 250 functions as an optical element installed for receiving an optical signal. As the light receiving element 250, the photo diode having a property of generating an electric current proportional to a received light. Another example of a suitable light receiving element includes an image sensor, such as a Charge-Coupled Device (CCD) sensor or a Complementary Metal Oxide Semiconductor (CMOS) optical sensor. The optical signal is outputted after being converted into an electrical signal through the light receiving element 250.

The selector 200 switches, under control of the controller 115 to make the photo detector-combined illuminance sensor 170 operate in one mode from among the visible light communication mode and the illuminance measurement mode. When the selector 200 operates in the visible light communication mode, the selector 200 transmits a signal outputted from the photo diode 250 to the low noise amplifier 210. To this end, the selector 200 may be connected to the low noise amplifier 210 so that the converted electrical signal can be transmitted to the controller 160 through the low noise amplifier 210 and the filter 220. In contrast, when the selector 200 operates in the illuminance measurement mode, the selector 200 transmits a signal output from the photo diode 250 to the optical data processor 230.

The low noise amplifier 210 amplifies the electrical signal output from the photo diode 250.

The filter 220 reduces DC noise by filtering specified frequency band elements of the amplified signal. The signal from which noise has been eliminated is transmitted to the controller 160.

The controller 160 determines whether the filtered signal corresponds to a visible light communication signal. When the signal corresponds to a visible light communication signal, the controller 160 performs an operation for the visible light communication, such as a link negotiation. In contrast, when the signal corresponds to a typical optical signal, the mode is changed to connect the selector 200 with the optical data processor 230. Then, the photo detector-combined illuminance sensor 170 operates in the illuminance measurement mode.

In the illuminance measurement mode, the optical data processor 230 measures an intensity of the optical signal, and the electric current amplifier 240 converts the intensity of the optical signal to a current value. The signal converted to the current value in this way is used to control a backlight of the display unit 125.

Hereinafter, an operation process in the mobile communication terminal for the visible light communication having the construction as described above will be described with reference to FIG. 3. Here, a basic mode of the photo detector-combined illuminance sensor 170 is in the visible light communication mode in which the photo detector-combined illuminance sensor 170 operates as a photo detector.

Figure 3:
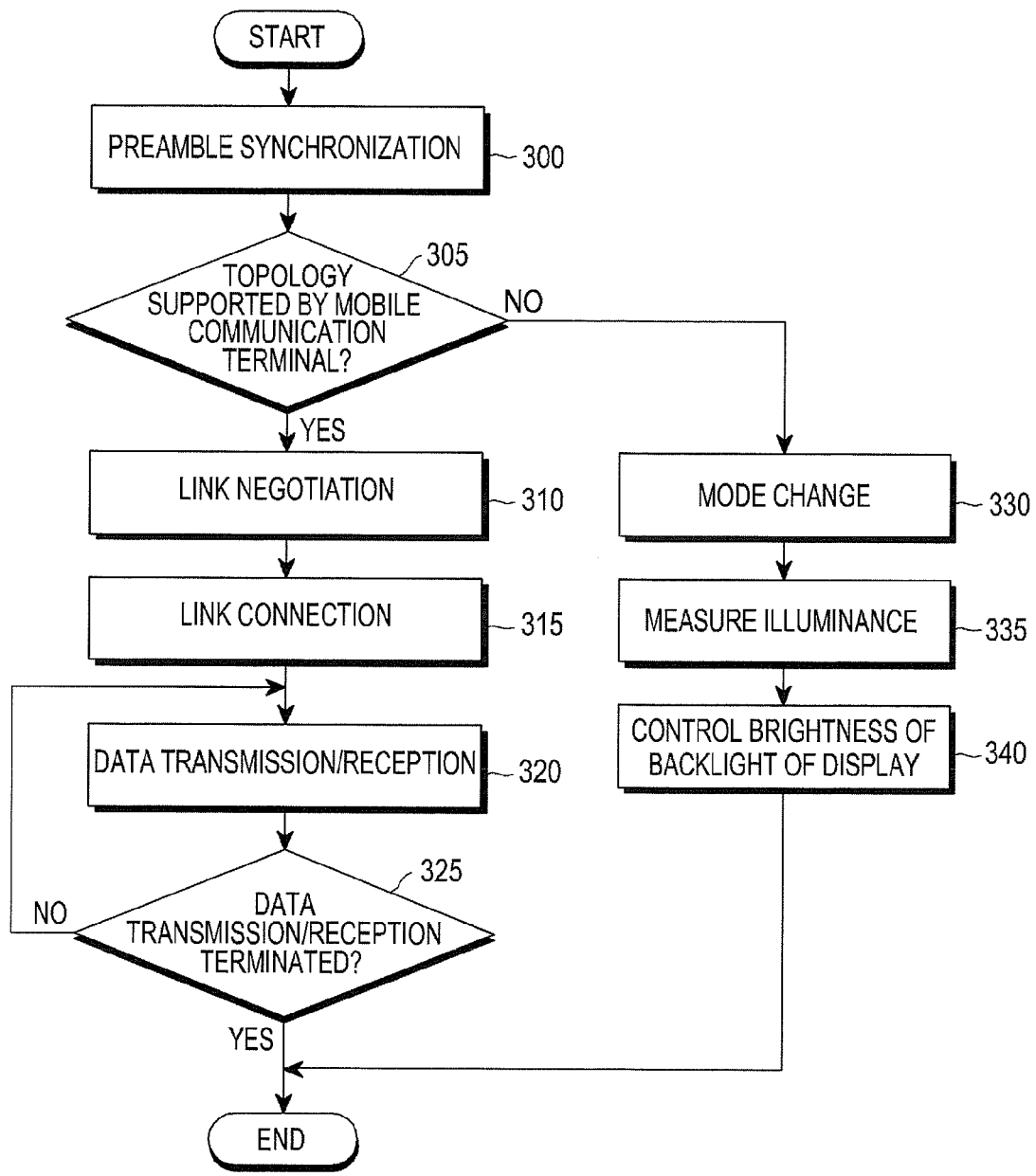
FIG. 3 illustrates an example operation of a visible light communication terminal according to an embodiment of the present invention.

Referring to FIG. 3, the mobile communication terminal 100 synchronizes with a preamble transmitted from a light source of the transmission side in step 300. Next, in step 305, the mobile communication terminal 100 determines whether the topology is supported, using the preamble. When the topology is supported, the mobile communication terminal 100 synchronizes with the transmission from the transmission side. For example, in the case where the mobile communication terminal 100 supports a P2P (peer-to-peer) topology, the mobile communication terminal 100 performs data transmission/reception with the transmission side using a 1:1 scheme.

To this end, the mobile communication terminal 100 negotiates with the transmission side for the link in step 310 and connects the link in step 315. Then, the mobile communication terminal 100 transmits and receives the data in the form of visible light form (step 320), and performs an operation repeatedly exchanging the data in the form of visible light unless the data transmission/reception is terminated (step 325).

When the topology is not supported by the mobile communication terminal 100, the mobile communication terminal 100 changes the mode in step 330. As a result, the visible light communication mode is changed to the illuminance measurement mode. Then, the mobile communication terminal 100 measures the illuminance through the photo detector-combined illuminance sensor 170, and adjusts the brightness of the backlight in the display unit by using the measured illuminance value in step 340.

Hereinafter, a reception function of the visible light communication will be described with reference to the construction of the visible light reception module capable of performing the visible light communication as shown in FIG. 2.

Figure 4:
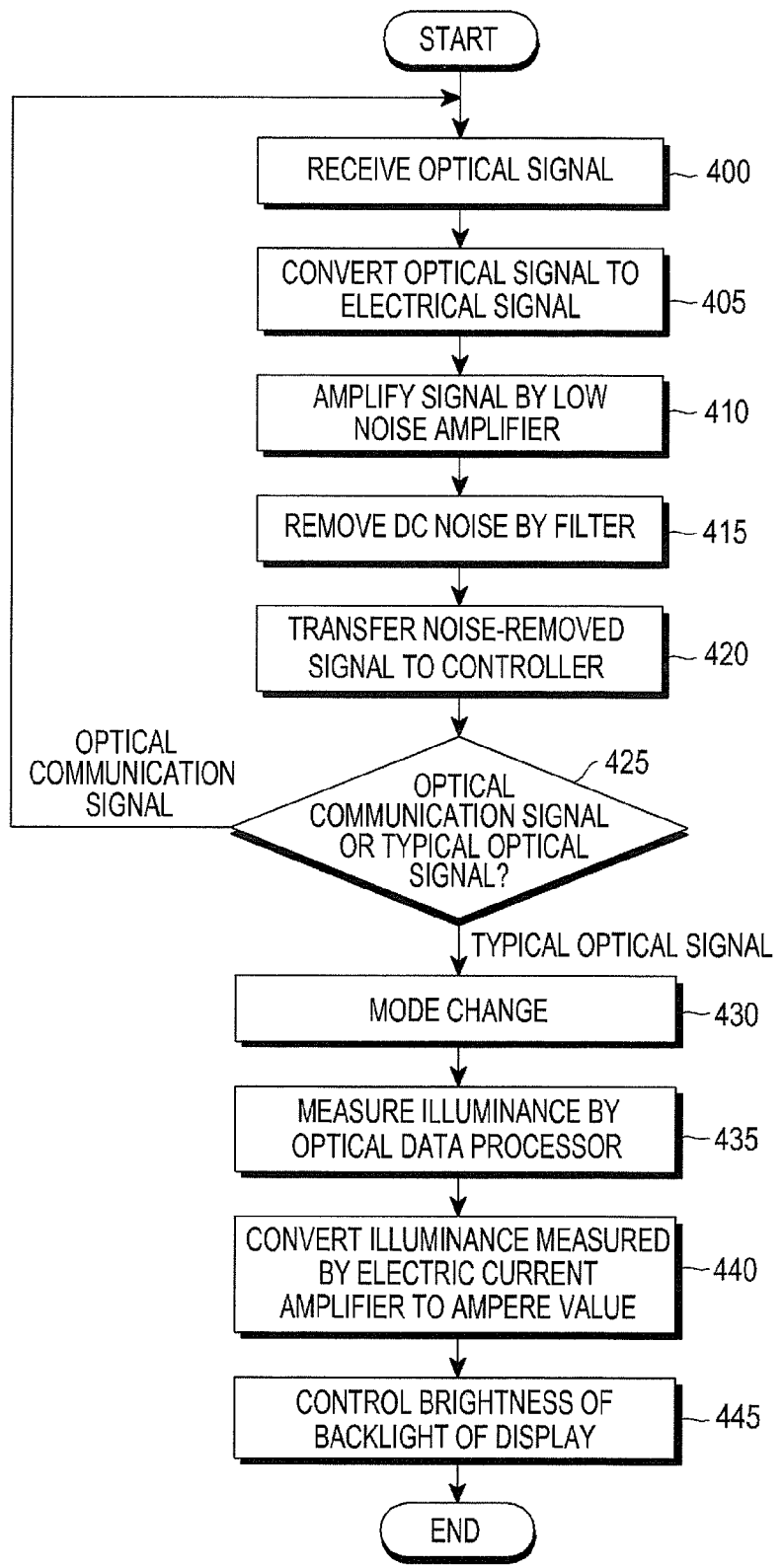
FIG. 4 illustrates an example method for visible light communication using an illuminance sensor according to an embodiment of the present invention.

Referring to FIG. 4, when the optical signal is received in step 400, the optical signal received through the light receiving element 250 is converted to an electrical signal in step 450. Next, the signal is amplified by the low noise amplifier 210 in step 410, and the DC noise is filtered from the amplified signal by the filter 220 in step 415. When the filtered signal is transmitted to the controller 160 in step 420, it is determined in step 425 whether the transmitted signal is a visible light communication signal or a typical optical signal.

When the transmitted signal is a visible light communication signal, the mobile communication terminal 100 returns to step 400, and transmits the received optical signal to the controller 160 through the process as described above. Here, the signal transmitted to the controller 160 may be demodulated into data depending on the visible light communication scheme. As an example of determining whether the transmitted signal is a visible light communication signal, a method of demodulating the transmitted signal in the form of data and then measuring an orthogonality of a preamble thereof, so as to determine whether the transmitted signal corresponds to a topology supporting the visible light communication.

In contrast, when the transmitted signal in step 425 includes an optical signal, the mobile communication terminal 100 changes the mode in step 430. Then, the selector 200 is connected to the optical data processor 230 and measures the illuminance by an optical data processor in step 435. Thereafter, the measured illuminance is converted to a current value by the electric current amplifier 240 in step 440, and the converted current value is used to adjust the backlight of the display unit 125 in step 445. As a result, it is possible to perform a visible light communication an existing visible light communication module configured in a mobile communication terminal equipped with an illuminance sensor.

According to the present invention, it is possible to implement a visible light receiver in a mobile communication terminal using a conventional optical sensor technology without the necessity of installing an additional photo diode In some embodiments, this feature may lower the manufacturing cost of the mobile communication terminal.

Furthermore, according to the present invention, it is possible to implement a visible light communication technology by using an illuminance sensor for an LED used as a flash and for adjusting brightness of a screen in a mobile communication terminal, which may make it possible to perform a the visible light communication any time by using such a mobile communication terminal.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A terminal configured to perform a visible light communication, the terminal comprising:
a light receiving element configured to:
receive an optical signal,
convert the optical signal to an electrical signal, and
output the converted electrical signal; and
a controller configured to:
control the terminal to operate in one of a visible light communication mode and a illuminance measurement mode based on the signal output from the light receiving element.

2. The terminal of claim 1, further comprising:
a light receiving element configured to receive the optical signal and convert the received optical signal to the electrical signal;
an optical data processor configured to measure an illuminance by using the electrical signal converted by the light receiving element;
an electric current amplifier configured to convert an illuminance value measured by the optical data processor to a current value;
a low noise amplifier configured to amplify the electrical signal converted by the light receiving element; and
a filter configured to remove DC noise from the signal amplified by the light receiving element.

3. The terminal of claim 2, wherein the light receiving element comprises a photo diode.

4. The terminal of claim 2, further comprising:
a selector configured to interconnect the light receiving element and one of the low noise amplifier and the optical data processor.

5. The terminal of claim 4, wherein, when an operation mode of the terminal is in the illuminance measurement mode, the controller is configured to control the selector to cause the selector configured to interconnect the light receiving element and the optical data processor to enable the electrical signal outputted from the light receiving element to be transferred to the optical data processor.

6. The terminal of claim 4, wherein, when an operation mode of the terminal is in the visible light communication mode, the controller is configured to control the selector to cause the selector to interconnect the light receiving element and the low noise amplifier to enable the electrical signal outputted from the light receiving element to be transferred to the low noise amplifier.

7. The terminal of claim 2, further comprising a display unit having a backlight, a brightness of the backlight configured to be controlled according to the converted current value.

8. The terminal of claim 1, wherein the controller is configured to demodulate the signal input to the controller data based on a visible light communication scheme to determine whether the output signal is a visible light signal.

9. A terminal configured to perform visible light communication, the terminal comprising:
a controller configured to:
demodulate a signal outputted from an illuminance sensor based on a visible light communication scheme in a visible light communication mode;
determine whether the output signal corresponds to a visible light communication signal by using the demodulated data; and
switch the visible light communication mode to an illuminance measurement mode for measuring an illuminance by the illuminance sensor based on determining that the output signal does not correspond to a visible light communication signal.

10. The terminal of claim 9, wherein the signal outputted from the illuminance sensor in the visible light communication mode includes a signal obtained by converting an optical signal received through a light receiving element into an electrical signal, amplifying the converted electrical signal by a low noise amplifier, and then removing DC noise from the amplified signal by a filter.

11. The terminal of claim 10, further comprising:
a light receiving element configured to receive an optical signal and converting the received optical signal to an electrical signal,
wherein the illuminance sensor is configured to measure an illuminance by using the electrical signal.

12. The terminal of claim 11, wherein the light receiving element interconnects the low noise amplifier to enable the electrical signal outputted from the light receiving element to be transferred to the low noise amplifier when the terminal is in the visible light communication mode.

13. The terminal of claim 12, wherein, when the output signal corresponds to a visible light communication signal, the controller is configured to control the illuminance sensor to operated the visible light communication mode.

14. The terminal of claim 9, wherein the controller is configured to control a brightness of a backlight of a display unit according to an illuminance measured by the illuminance sensor in the illuminance measurement mode.

15. A terminal comprising:
a light receiving element configured to:
receive an optical signal,
convert the optical signal to an electrical signal, and
output the converted electrical signal; and
a controller configured to:
determine whether a signal output from an illuminance sensor includes a visible light communication signal, and
control the illuminance sensor to measure an illuminance based on determining that the signal output from the illuminance sensor is not the visible light communication signal.

16. The terminal of claim 15, wherein the illuminance sensor comprises:
a light receiving element configured to receive the optical signal and convert the received optical signal to an electrical signal;
an optical data processor configured to measure an illuminance by using the electrical signal converted by the light receiving element;
an electric current amplifier configured to convert an illuminance value measured by the optical data processor to a current value;
a low noise amplifier configured to amplify the electrical signal converted by the light receiving element; and
a filter configured to remove DC noise from the signal amplified by the light receiving element.

17. The terminal of claim 16, wherein the light receiving element comprises a photo diode.

18. The terminal of claim 16, further comprising a selector configured to interconnect the light receiving element and the low noise amplifier to enable the electrical signal outputted from the light receiving element to be transferred to the low noise amplifier under control of the controller when the terminal is in the visible light communication mode.

19. The terminal of claim 18, wherein, when the terminal is in the illuminance measurement mode, the selector is configured to interconnect the light receiving element and the optical data processor to enable the electrical signal outputted from the light receiving element to be transferred to the optical data processor.

20. The terminal of claim 19, wherein, when the output signal is not a visible light signal, the controller is configured to control the selector to cause the selector to interconnect the light receiving element and the optical data processor.

* * * * *